No. 609,376. Patented Aug. 16, 1898.
W. L. WALL.
KNIFE GUARD FOR MOWING MACHINES.
(Application filed Nov. 17, 1896.)

(No Model.)

Witnesses
Victor J. Evans.
J. G. Tabler,

Inventor
William L. Wall.
by John Wedderburn
Attorney

UNITED STATES PATENT OFFICE.

WILLIAM LACY WALL, OF EAST RADFORD, VIRGINIA.

KNIFE-GUARD FOR MOWING-MACHINES.

SPECIFICATION forming part of Letters Patent No. 609,376, dated August 16, 1898.

Application filed November 17, 1896. Serial No. 612,428. (No model.)

*To all whom it may concern:*

Be it known that I, WILLIAM LACY WALL, a citizen of the United States, residing at East Radford, in the county of Montgomery and State of Virginia, have invented certain new and useful Improvements in Knife-Guards for Mowing-Machines; and I do hereby declare the following to be a full, clear, and exact description of the invention, such as will enable others skilled in the art to which it appertains to make and use the same.

My invention relates to mowing-machine fingers or guards.

It consists in making the said guards or fingers with certain knife-edges, so that these edges will cut the grass and other stuff which collects thereon.

Figure 1:
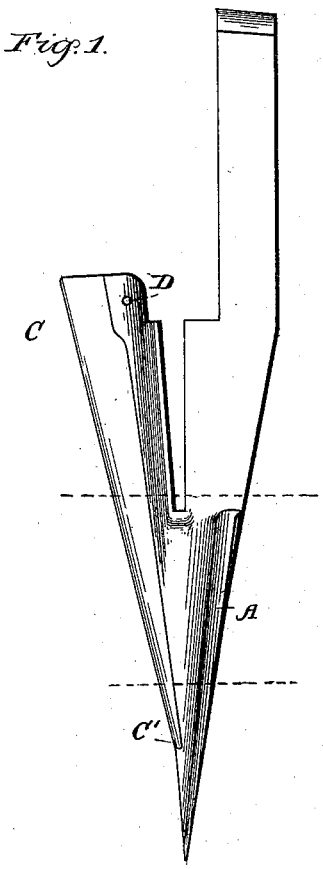
Figure 2:
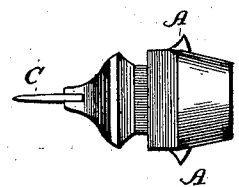
Figure 3:
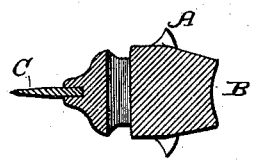
Figure 4:
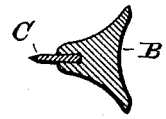

In the drawings, Figure 1 is an elevation of my guard. Fig. 2 is a rear elevation of the subject-matter of Fig. 1. Figs. 3 and 4 are sections taken across the same at different points.

The object of this invention is to prevent the clogging of the fingers by dried or tangled grass or other substances which are apt to collect in said places. This is secured by making certain edges on the fingers or guards knife-edges, which will cut the grass and allow it to be freed therefrom.

The forward portion of my guard is made triangular, with knife-edges A upon each angle thereof. The bottom of the guard is made with a concavity or hollow B running lengthwise the same. This tends to assist in keeping the knife-edge sharp.

Upon the top side of the guard a narrow slit or recess is formed longitudinal the same. In this a narrow strip C of steel is inserted and secured by having the forward end C' catch under a projecting portion of the guard proper. The rear end is secured by a rivet D to the guard or knife. This rivet may be made as a screw, so as to make the knife readily removable. In fact, both ends may be fastened by either rivets or screws, if desired. This knife C is made sharp upon its upper edge. The dried grass or other material caught upon the fingers or guards will be cut by this knife and will then slip off the guard. This knife C is of such shape that it may be readily sharpened, and thus kept in good cutting condition. The bottom knife-edges A may also be sharpened by filing off the bottom. This may be readily done by reason of the concavity B therein. This device will prevent the accumulation of material upon the knife, which would prevent the grass from getting back between the fingers, where the sickle can readily reach it.

The knife-edges A upon the lower portion of the guard and forming a part thereof are not essential features of my invention. The essential feature is the inserted knife-blade C. The point of my guard should be sharp and not rounded, as in the usual guard. The triangular shape assists materially in keeping the edges sharp. The sides of the triangle are each made concave.

Having thus described my invention, what I claim as new, and desire to secure by Letters Patent, is—

1. A slotted guard-finger for harvesting-machines provided in its upper face with a longitudinal groove extending to near the point of the guard and through the cap portion thereof, in combination with an upright knife-blade secured in said groove and made tapering from its rear end to its point, substantially as and for the purpose described.

2. A slotted guard-finger for harvesters provided on its opposite sides in front of and below the plane of the knife-slot, with laterally-projecting knife-edges, and in its cap portion overhanging and in advance of the knife-slot with a vertical longitudinal groove, in combination with a tapering upright knife-blade removably secured in said groove, substantially as described.

3. A slotted guard-finger for harvesting-machines made tapering to a point at its forward end and provided on its sides in advance of the knife-slot with laterally-projecting, V-shaped ribs located below the plane of the knife-slot and expanding in width from the point rearward, and in its upper face or cap portion in advance of and above the knife-slot with a vertical longitudinal groove, in combination with a tapering knife-blade secured in said groove, for the purpose and substantially as described.

In testimony whereof I have signed this specification in the presence of two subscribing witnesses.

WILLIAM LACY WALL.

Witnesses:
I. D. PETERS,
JAMES J. WALL.